United States Patent
Kim et al.

(10) Patent No.: US 8,073,621 B2
(45) Date of Patent: Dec. 6, 2011

(54) NAVIGATION APPARATUS AND METHOD FOR PROVIDING TURN-BY-TURN POSITION LIST

(75) Inventors: Hyun-Seok Kim, Suwon-si (KR); Kun-Sik Lee, Seoul (KR); Jun-Ho Park, Bucheon-si (KR); Yu-Ri Lee, Seoul (KR); Jae-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 605 days.

(21) Appl. No.: 12/327,629

(22) Filed: Dec. 3, 2008

(65) Prior Publication Data

US 2009/0171575 A1 Jul. 2, 2009

(30) Foreign Application Priority Data

Dec. 27, 2007 (KR) .................. 10-2007-0139277

(51) Int. Cl.
*G01C 21/30* (2006.01)
*G01C 21/32* (2006.01)
*G01C 21/00* (2006.01)

(52) U.S. Cl. .................. 701/211; 701/209; 701/213

(58) Field of Classification Search .................. 701/201, 701/208, 209, 211, 213
See application file for complete search history.

(56) References Cited

U.S. PATENT DOCUMENTS

| | | | | |
|---|---|---|---|---|
| 6,748,317 | B2 * | 6/2004 | Maruyama et al. | 701/200 |
| 7,729,855 | B2 * | 6/2010 | Schmitz | 701/211 |
| 7,856,313 | B2 * | 12/2010 | Nakamura | 701/208 |
| 7,925,438 | B2 * | 4/2011 | Lo | 701/211 |
| 2004/0204825 | A1 * | 10/2004 | Maruyama et al. | 701/200 |
| 2005/0261825 | A1 | 11/2005 | Nix et al. | |
| 2005/0273252 | A1 | 12/2005 | Nix et al. | |
| 2007/0073474 | A1 * | 3/2007 | Nakamura | 701/207 |
| 2008/0120028 | A1 * | 5/2008 | Schmitz | 701/211 |
| 2009/0112462 | A1 * | 4/2009 | Lo | 701/209 |

FOREIGN PATENT DOCUMENTS

| | | |
|---|---|---|
| EP | 1256785 A2 | 11/2002 |
| JP | 2002-365065 A | 12/2002 |
| JP | 2004-177137 A | 6/2004 |

* cited by examiner

*Primary Examiner* — Amee A Shah
(74) *Attorney, Agent, or Firm* — Birch, Stewart, Kolasch & Birch, LLP (57) ABSTRACT

The present invention relates to a navigation apparatus and a method for providing a user with a list of turn-by-turn positions (TBTs) located ahead on a route. The navigation apparatus of the present invention according to an embodiment comprises a GPS receiving module for receiving navigation satellite signals and calculating a position; a controller for receiving position information from the GPS receiving module, outputting the position information together with map information, and controlling operation of the GPS receiving module; and a storage unit for storing the map information, wherein the controller displays information on two or more TBTs on a proceeding route in the form of a list, the list having a size determined depending on distances to the TBTs included in the TBT information. According to the present invention, there are advantages in that a user can easily recognize information on TBTs ahead and drive a vehicle along a set route only with a TBT list.

29 Claims, 6 Drawing Sheets

FIG. 1a

Related Art

FIG. 1b

Related Art

FIG. 1c

Related Art

FIG. 1d

Related Art

NAVIGATION APPARATUS AND METHOD FOR PROVIDING TURN-BY-TURN POSITION LIST

CROSS REFERENCE TO RELATED APPLICATIONS

The present application is related to, and claims priority to, Korean patent application 10-2007-0139277, filed on Dec. 27, 2007, the entire contents of which are hereby incorporated by reference.

BACKGROUND OF THE INVENTION

1. Field of the Invention

The present invention relates to a navigation apparatus, computer program product and a method for providing a user with a list of turn-by-turn positions (hereinafter, referred to as TBTs) located ahead on a route, and more specifically, to a navigation apparatus, computer program product and a method for providing a TBT list, in which information on a plurality of TBTs existing ahead is provided in the form of a list so that a user may easily recognize the TBTs, and the TBT list is updated and displayed in accordance with the movement of the navigation apparatus.

2. Description of the Related Art

Recently, navigation apparatuses for showing the current position and guiding a route using global positioning system (GPS) signals are widely distributed to vehicles in order to guide routes. As the navigation apparatuses efficiently guide routes and a variety of functions are added for users to easily find their ways, their ranges of utilization are gradually expanded.

If there are TBTs ahead in guiding a set route, a navigation apparatus informs a user of the TBTs so that the user may pay attention to the TBTs ahead and not enter a wrong way. In addition, the navigation apparatus is provided with a function of showing only the information on the TBTs except straight driving sections.

FIGS. 1a to 1d are exemplary views showing steps of displaying a TBT list on a conventional navigation apparatus.

Figure 1A:
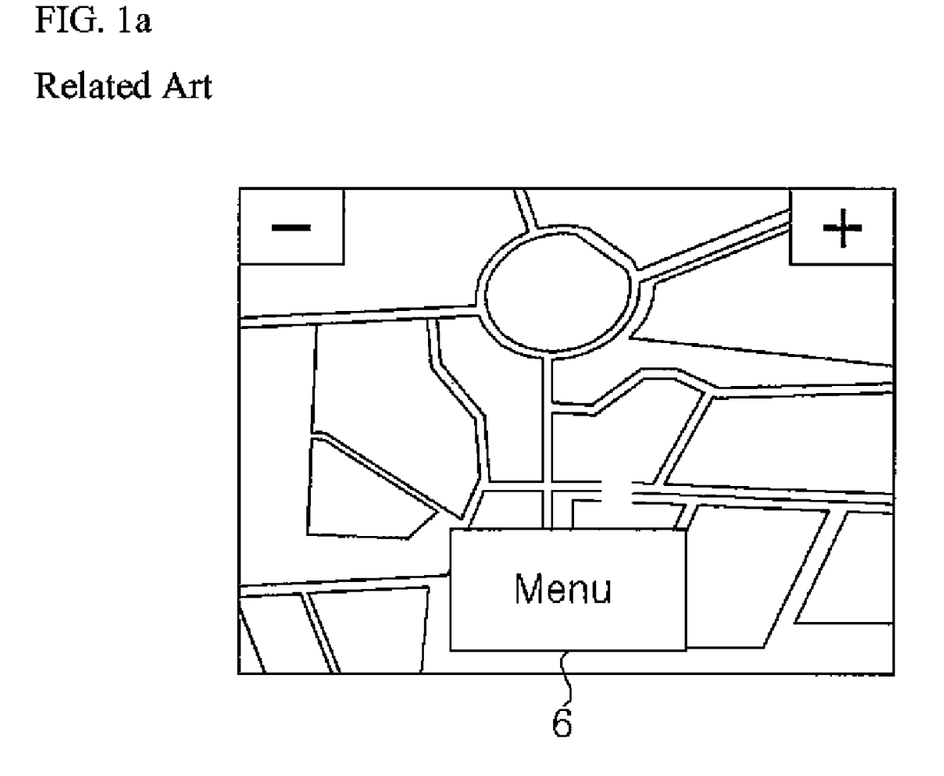
FIGS. 1a to 1d are exemplary views showing steps of displaying a TBT list on a conventional navigation apparatus.

As shown in the figures, in order to be provided with only the TBT information from the navigation apparatus, a user selects a "menu" button 6 on the navigation apparatus and enters a menu search screen (see FIG. 1a).

Figure 1B:
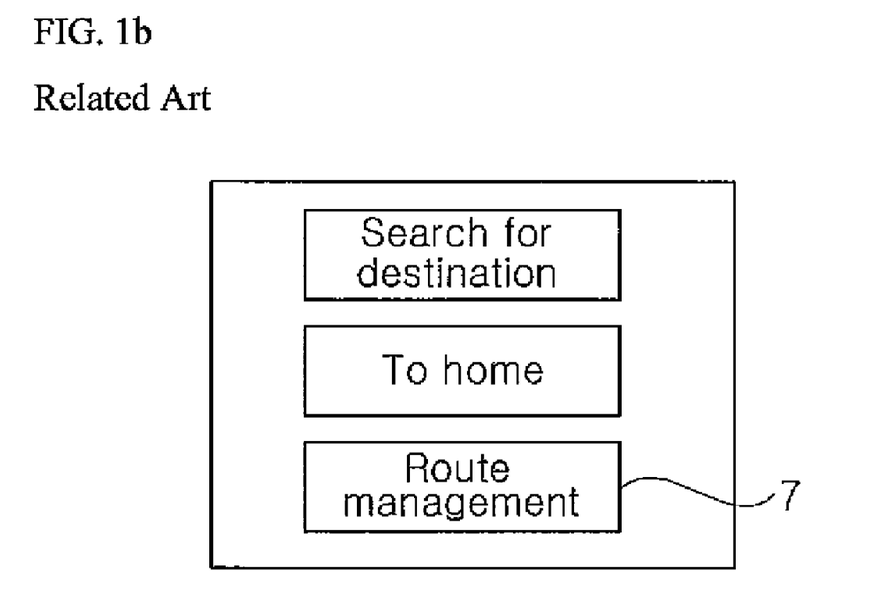

Thereafter, the user selects a "route management" button 7 from a menu screen as shown in FIG. 1b.

Figure 1C:
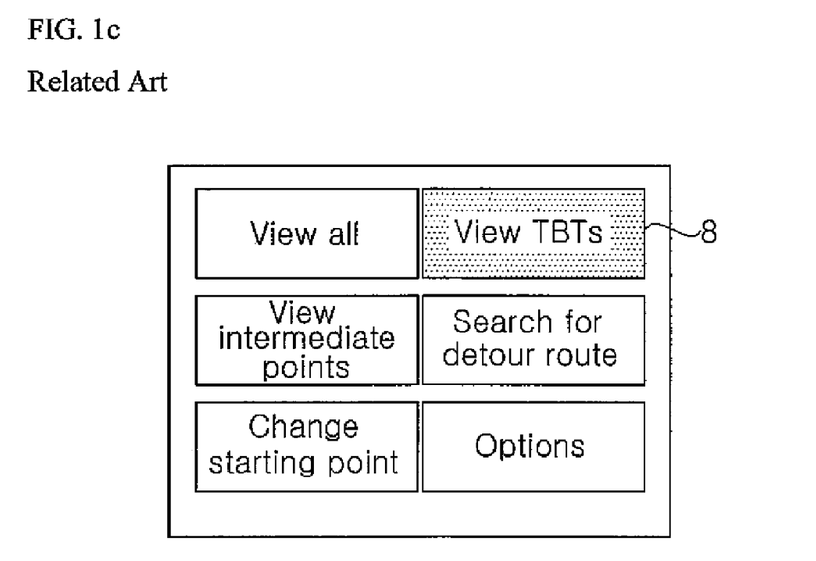
Figure 1D:
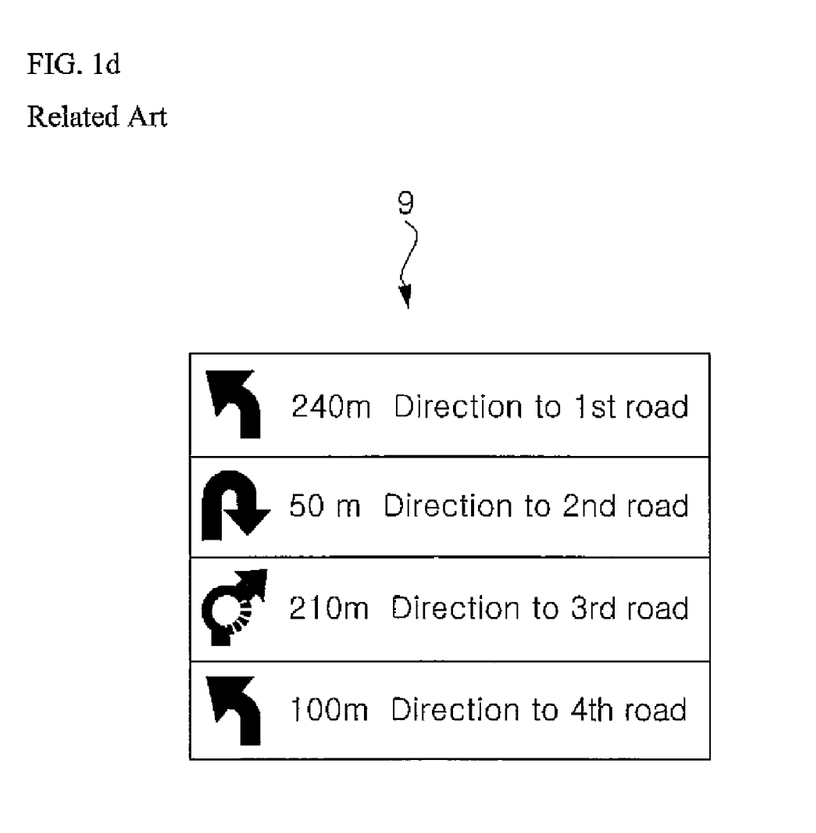

Then, the user selects a "view TBT" button 8 among route management items as shown in FIG. 1c If the "view TBT" button 8 is selected, a TBT list screen is displayed as shown in FIG. 1d.

At this time, a TBT list 9 including TBT information of all routes is shown in the displayed screen.

However, the related art described above has the following problems.

That is, since the TBT list for all routes is displayed at the same size and interval as a whole, a user should read distance information included in the TBT information and estimate the distance. Accordingly, since the user should grasp the TBTs depending on the user's sense, there is a problem in that it is difficult for a user who does not have a keen sense of distance to intuitively know the TBTs.

Furthermore, in the related art, since the TBT list shows information on all TBTs for all routes, there is a problem in that information on TBTs ahead, in which the user is most interested, cannot be provided for the user to conveniently recognize the TBTs.

SUMMARY OF THE INVENTION

The present invention is conceived to solve the aforementioned problems and other limitations in the related art. An object of the present invention is to provide a navigation apparatus for displaying a TBT list configured to be easily recognized by a user when displaying the TBT list of the navigation apparatus to the user, and a method for providing the TBT list.

Another object of the present invention is to provide a navigation apparatus for updating and displaying a provided TBT list according to the movement of the navigation apparatus, whereby a user may recognize a driving state through the TBT list, and a method for providing the TBT list.

According to an aspect of the present invention for achieving the objects, there is provided a navigation apparatus, which comprise a GPS receiving module for receiving navigation satellite signals and calculating a position; a controller for receiving position information from the GPS receiving module, outputting the position information together with map information, and controlling operation of the GPS receiving module; and a storage unit for storing the map information, wherein the controller displays information on two or more TBTs on a proceeding route in the form of a list, the list including two or more display areas having sizes respectively determined depending on distances to the TBTs included in the TBT information.

Here, the TBT information may include a location of a TBT and a proceeding direction at the TBT.

In addition, the controller may make out the TBT list by arranging two or more display areas for displaying the TBT information in a vertical direction, and determine heights of the respective display areas depending on the distances to the TBTs among the TBT information displayed in the display areas.

Further, the controller may determine the heights of the display areas in proportion to the distances to the TBTs. The TBT list may include a predetermined number of the display areas.

In the meantime, the TBT list may include a predetermined N number of the display areas included in a limited distance ahead.

In addition, the apparatus may further comprise a wireless communication module for receiving traffic information, wherein a display form of the TBT list is determined depending on the received traffic information.

Here, the display form changed depending on the traffic information may be display colors of the display areas.

Further, the information indicating the proceeding direction among the TBT information may be displayed as an icon showing the proceeding direction, and the icon may show a road type using different display forms for a driving road and a non-driving road.

Here, the icon may be displayed to be popped up or enlarged depending on corresponding TBT information.

Further, the controller may detect a change in current position of the navigation apparatus by calculating the current position thereof and updates the TBT list depending on the TBT information changed according to the changed position.

In addition, the controller may detect a moving speed of the navigation apparatus and display the TBT list scrolled according to the moving speed.

Here, the controller may detect a change in the position of the navigation apparatus, recalculate heights of all or some of the display areas depending on the changed position, and display the TBT list.

In the meantime, according to another aspect of the present, there is provided a computer program product and a method for providing a TBT list in a navigation apparatus for displaying TBT information on a driving route to a user while driving. The method comprises the steps of displaying information on two or more TBTs on the proceeding route in the form of a list; and determining a display size of the list depending on distances to the TBTs included in the TBT information.

According to the navigation apparatus and the method for providing a TBT list according to the present invention as described above, the following effects can be expected.

When displaying the TBT list of the navigation apparatus to a user, since the display areas of the TBT list is displayed in proportion to the distances to TBTs, there is an advantage in that the user may easily grasp the TBTs through the TBT list.

Furthermore, since a TBT list is updated and displayed according to the movement of the navigation apparatus in the present invention, a user can recognize a driving state through the TBT list thereby driving a vehicle along a set route only with the TBT list.

DESCRIPTION OF THE PREFERRED EMBODIMENTS

Hereinafter, a method for providing a TBT list of a navigation apparatus according to a specific embodiment of the present invention will be described in detail with reference to the accompanying drawings.

Figure 2:
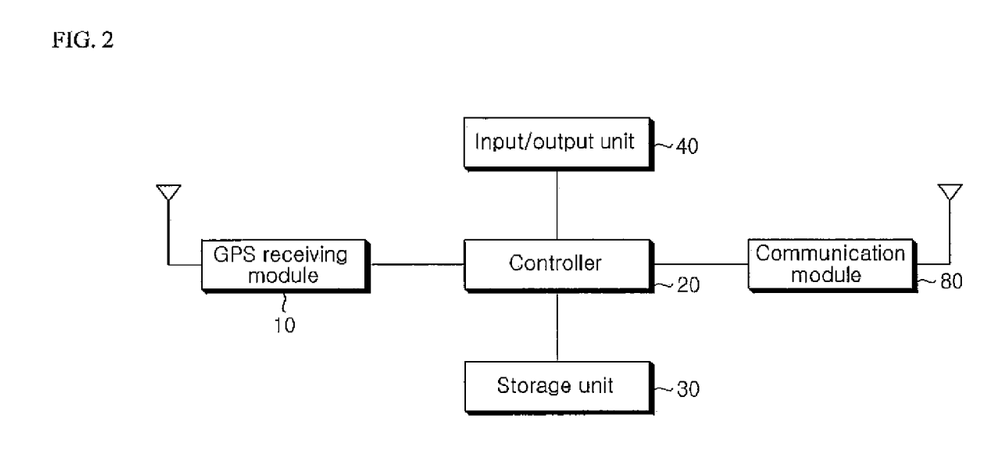
FIG. 2 is a block diagram showing the configuration of a navigation apparatus according to a specific embodiment of the present invention.

FIG. 2 is a block diagram showing the configuration of the navigation apparatus according to the specific embodiment of the present invention.

As shown in FIG. 2, the navigation apparatus according to the specific embodiment of the present invention includes a GPS receiving module 10 for receiving navigation satellite signals (hereinafter, referred to as GPS signals) and calculating a position based on the GPS signals.

The GPS receiving module 10 receives the GPS signals at regular intervals and updates position information. For this purpose, the GPS receiving module is provided with an antenna for receiving signals, a memory, a GPS chip, a GRF chip, filters, a control chip, and the like. Since a variety of conventional GPS receiving modules is commercialized, the configuration of the GPS receiving module will not be described in detail in the specification.

A controller 20 for receiving and processing the position information calculated by the GPS receiving module and controlling the operation of the GPS receiving module is connected to the GPS receiving module. The controller 20 searches for TBT information, detects information on TBTs ahead, and displays the searched basic TBT information to a user. At this time, the basic TBT information is displayed in the form of a list comprising two or more pieces of TBT information (hereinafter, referred to as a TBT list).

The TBT list is a list that sequentially arranges information on TBTs ahead as many as a predetermined number n in order of distances apart from the current position. At this time, the arrangement means that the TBT list 50 comprises two or more display areas 60 divided in the horizontal direction and sequentially arranged in the vertical direction and the TBT information is displayed in the respective display areas 60.

The controller 20 detects the movement of the navigation apparatus and updates and outputs the TBT list 50 according to the position of the navigation apparatus.

The controller 20 may also perform the update by scrolling the TBT list 50. In one aspect, the scroll is a TBT list 50 that is caused to move at a speed corresponding to the moving speed of the navigation apparatus. In one aspect, the position of the same screen is not caused to move, but a portion corresponding to a passed area is caused to disappear toward the bottom of the screen on which the TBT list 50 is displayed and information on new TBTs ahead is displayed on the upper portion of the TBT list 50.

The controller 20 sets different heights of the display areas 60 depending on distance information contained in the TBT information. That is, the height of a corresponding display area 60 is large if a distance to a TBT is long, whereas the height of a display area 60 is small if a distance to a TBT is short.

In one aspect, the distance information is a distance between TBTs. That is, the distance is a distance from the previous TBT to the current TBT.

The heights of the display areas 60 may be read from a lookup table or calculated by an operational expression.

A storage unit 30 for storing map information is connected to the controller 20. The map information is information on a map for displaying the position information calculated by the GPS receiving module on the map. The map information contains information on TBTs.

When the controller 20 calculates heights of the display areas 60 using a lookup table, the lookup table is stored in the storage unit 30.

In addition, an input/output unit 40 for receiving a command from a user and informing the user of a search result is provided in the controller 20. The input/output unit 40 may be configured as a touch screen apparatus.

The navigation apparatus according to the present invention may be configured to include a communication module 80. The communication module 80 is a module for receiving traffic information. For example, in a transport protocol expert group (TPEG) service currently provided through DMB broadcast, a DMB receiver module becomes the communication module 80.

The received traffic information is reflected when the controller sets a route or used to change a form of providing the TBT list depending on traffic conditions in providing the TBT list.

Hereinafter, the operation of the present invention will be described in detail according to a method for providing TBT information of a navigation apparatus with reference to the accompanying drawings.

Figure 3:
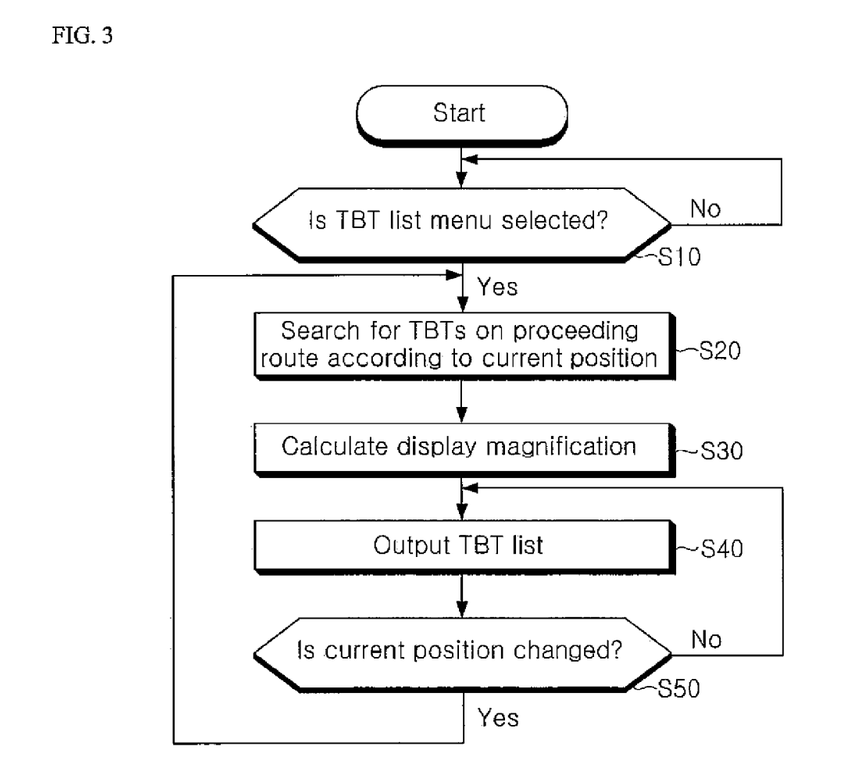
FIG. 3 is a flowchart illustrating a method for providing a TBT list of a navigation apparatus according to a specific embodiment of the present invention.
Figure 4:
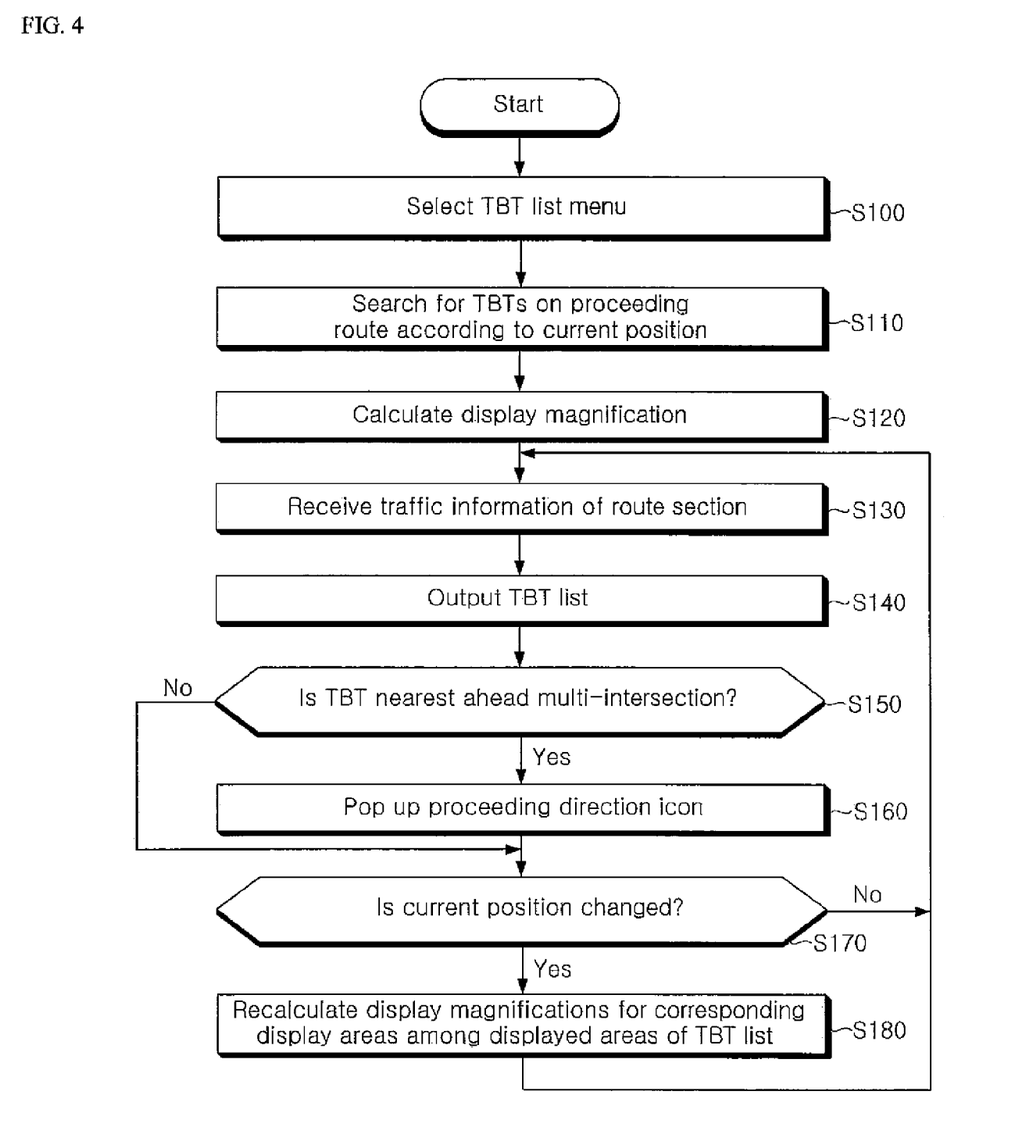
FIG. 4 is a flowchart illustrating a method for providing a TBT list of a navigation apparatus according to another embodiment of the present invention.

FIG. 3 is a flowchart illustrating a method for providing a TBT list of a navigation apparatus according to a specific embodiment of the present invention, and FIG. 4 is a flowchart illustrating a method for providing a TBT list of a navigation apparatus according to another embodiment of the present invention.

As shown in FIG. 3, the method for providing a TBT list of the navigation apparatus according to the specific embodiment of the present invention starts from detecting a selection input of a user from a TBT list menu (step S10).

The selection of a TBT list menu may be performed through a variety of methods. For example, an additional menu may be provided to perform the selection as in a prior art, or the selection may be automatically performed when a particular change is taken place on the route while driving.

If the selection of the TBT list menu is detected, the controller 20 searches for TBTs on the set route (step S20). In one aspect, the controller also searches for directions and distances from the current position 60, as well as the TBTs. Then, the controller searches for information on predetermined n TBTs ahead. The controller may also search for information on TBTs included within a set distance.

The controller 20 calculates display magnifications of the display areas 60 on which the TBT information is displayed (step S30).

Figure 5A:
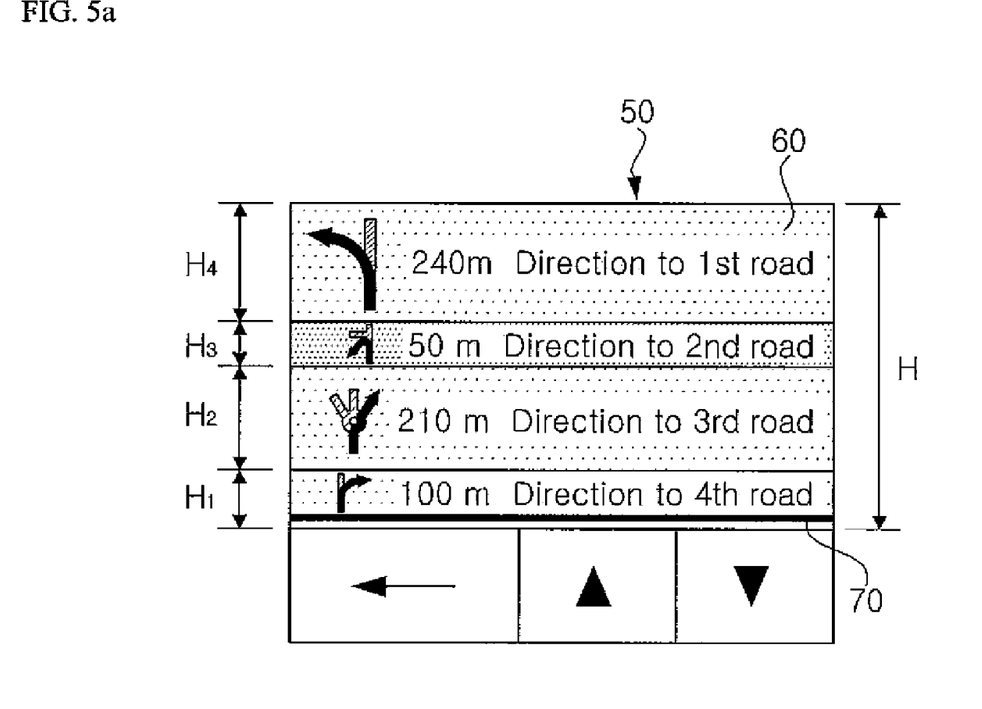
FIGS. 5a to 5d are exemplary views showing changes of a TBT list displayed on the navigation apparatus according to the present invention step by step.

Here, the calculation of the magnifications is aimed at calculating heights H1, H2, H3, . . . , and Hn of the respective display areas 60 in the TBT list shown in FIG. 5a.

The heights are determined depending on distance information contained in the TBT information to be displayed on the respective display areas 60.

The heights may be (1) read from a lookup table or (2) calculated by an operational expression.

First, a case of reading heights from a lookup table will be described. The lookup table is a table in which heights of the respective display areas 60 are determined depending on distance ranges, and the heights are set to be higher as the distances are longer.

An example of the lookup table is shown in the following Table 1.

TABLE 1

| Step | Distance range | List height |
|---|---|---|
| 1 | 0~500 m | $H \times \frac{1}{6}$ |
| 2 | 500 m~1 Km | $H \times \left(\frac{1}{6} + \frac{1}{10}\right)$ |
| 3 | 1 Km~10 Km | $H \times \left(\frac{1}{6} + \frac{2}{10}\right)$ |
| 4 | 10 Km~30 Km | $H \times \left(\frac{1}{6} + \frac{3}{10}\right)$ |
| 5 | 30 Km~50 Km | $H \times \left(\frac{1}{6} + \frac{4}{10}\right)$ |
| 6 | More then 50 Km | $H \times \left(\frac{1}{6} + \frac{5}{10}\right)$ |

In the above table, the list height is a height of each display area 60. H is the available maximum height of the TBT list.

The available maximum height of the TBT list is a maximum height where the TBT list may occupy the screen of the navigation apparatus, and generally, the available maximum height is set differently depending on the type of the navigation apparatus (e.g., the size of the screen or the like).

Next, a case of calculating heights of the display areas 60 will be described by an operational expression. The heights are set in proportion to the distances.

The operational expression is a mathematical expression that differently determines the heights in proportion to the distances.

An example of the operational expression is shown in the following Mathematical Expression 1.

$$H_1 = \frac{l_1}{\sum_{m=1}^{n} l_m} \times H$$

$$H_2 = \frac{l_2}{\sum_{m=1}^{n} l_m} \times H$$

$$M$$

$$H_n = \frac{l_n}{\sum_{m=1}^{n} l_m} \times H$$

[Mathematical Expression 1]

where, H denotes the available maximum height of the TBT list, n denotes the number of the display areas configuring the TBT list, Hn denotes the height of the display area displayed in the n-th position, and ln denotes distance information on the TBT included in the n-th display area.

That is, Mathematical Expression 1 is an expression that calculates Hn by multiplying the total height H by a ratio of a distance of the information on the corresponding TBT to the sum of all distances contained in the information on the 1 to n TBTs.

In this manner, the display areas 60 are configured using the calculated heights, a TBT list 50 is constructed by including the information on the respective TBTs in the display areas 60, and the constructed TBT list is outputted (step S40).

After outputting the TBT list 50, the controller determines whether the position of the navigation apparatus is changed (step S50).

If the current position has changed, the process returns to step S20, and the controller creates and displays a new TBT list based on the changed current position. If the current position is not changed, the controller maintains the outputted TBT list.

The TBT list is changed as the current position is changed since if the current position is changed, the distance information contained in the TBT information of the first display area 60 is changed, and then, the display magnifications of the entire TBT list are changed accordingly.

If the update of the TBT list is continuously performed, the TBT list is displayed as if the TBT list is scrolled while the position of the navigation apparatus is changed. If update is performed at regular time intervals, the TBT list is displayed as it is updated at regular time intervals.

In the meantime, as shown in FIG. 4, according to another embodiment of the present invention, the method for providing a TBT list starts from detecting a selection input of a user for a TBT list menu (step S100).

The selection of a TBT list menu is the same as described above.

If the selection of the TBT list menu is detected, the controller 20 searches for TBTs on the set route (step S110). At this time, the controller also searches for directions and distances from the current position 60, as well as the TBTs.

Then, the controller searches for information on predetermined n TBTs ahead or information on TBTs included within a set distance.

The controller 20 calculates display magnifications of the display areas 60 on which the TBT information is displayed (step S120).

Here, the magnifications are heights H1, H2, H3, . . . , and Hn of the respective display areas 60 in the TBT list, and the heights are determined depending on distance information contained in the TBT information that is to be displayed on the respective display areas 60.

The heights may be (1) read from a lookup table or (2) calculated by an operational expression as described above.

The TBT information to be displayed may be (a) n predetermined pieces of information, (b) all TBT information included within a previously set limited distance, or (c) n or less pieces of TBT information included in the previously set limited distance.

Next, the controller searches for traffic information of TBTs included in the TBT list from information on traffic conditions received through the communication module 80 (step S130).

In this manner, the display areas 60 are configured using the calculated heights, and display forms (colors) of the display areas 60 are determined depending on the traffic conditions. The TBT list 50 is created by including respective pieces of TBT information in the display areas 60, and the created TBT list is outputted (step S140).

The controller 20 determines whether the TBT nearest ahead of the current position of the navigation apparatus is a multi-intersection (step S150), to which a driver should pay attention while driving.

The multi-intersection is a preset specific position, such as a fork in the road having three or more branches direction or a junction on a highway.

If the next TBT is determined to be a multi-intersection in step 150, a proceeding direction icon in the TBT list is displayed at a relatively large magnification through a pop-up window (step S160).

Here, the pop-up may be used to display the displayed proceeding direction icon on a large scale at the same position or to float an additional window outside of the TBT list to display the icon.

After outputting the TBT list 50, the controller determines whether the position of the navigation apparatus is changed (step S50).

If the current position has been changed, the controller recalculates display magnifications of the corresponding ones among the display areas 60 of the TBT list depending on the change of the position (step S180).

At this time, the display areas 60 of the TBT list for which the display magnifications are recalculated may be all the display areas configuring the TBT list. However, in this case, since the display magnifications of the display areas 60 are changed in real-time while driving, it is worried that the readability of the user may be degraded.

Accordingly, in recalculating the display magnifications of the display areas 60, it is preferable that the recalculation is performed on the display areas excluding the display areas that display information on N TBTs nearest ahead of the current position of the navigation apparatus. In this case, the total height of the remaining display areas excluding the N display areas is proportionally divided depending on respective distance information to thereby calculate the height of each display area.

Hereinafter, in describing FIGS. 5a to 5d in detail, it is assumed that the display area of the TBT nearest ahead is excluded.

The process returns to step S140, and the TBT list is displayed depending on the recalculated display magnification.

However, if it is determined from the result of step S170 that the current position is not changed, the previously outputted TBT list is maintained.

Hereinafter, an example of providing a TBT list according to the present invention will be described in detail with reference to the accompanying drawings.

FIGS. 5a to 5d are exemplary views showing changes of a TBT list displayed on the navigation apparatus according to the present invention step by step.

First, as shown in FIG. 5a, the TBT list 50 according to the specific embodiment of the present invention comprises four display areas 60, and corresponding TBT information is display in each of the display areas. In other aspects, the number of display areas 60 may be more or less than four.

The heights H1, H2, H3, and H4 of the respective display areas 60 are calculated depending on distance information in the TBT information, and it is understood that the total sum of H1, H2, H3, and H4 is H. The heights may be different depending on the set values when a look table is used.

In addition, a leader line 70 for indicating the current position may be displayed on the screen. It is apparent that the lower end of the TBT list 50 may indicate the current position without using the leader line 70.

That is, if the lowermost display area 60 entirely passes through the leader line 70 or the lower end of the TBT list 50, it means that the navigation apparatus has passed through the corresponding TBT.

In the display area, a direction indicating icon, distance information, and brief information on a TBT may be included. The direction indicating icon may be displayed in the form of an intersection at the TBT, and the set route is displayed with a different thickness or color.

Each of the display areas may be displayed to have a different contrast or background color. A section represented by the bright display area in FIG. 5a shows smooth traffic flow, and a section of a dark display area shows that traffic flow is not smooth. These traffic conditions may be classified into a plurality of states and displayed.

Figure 5B:
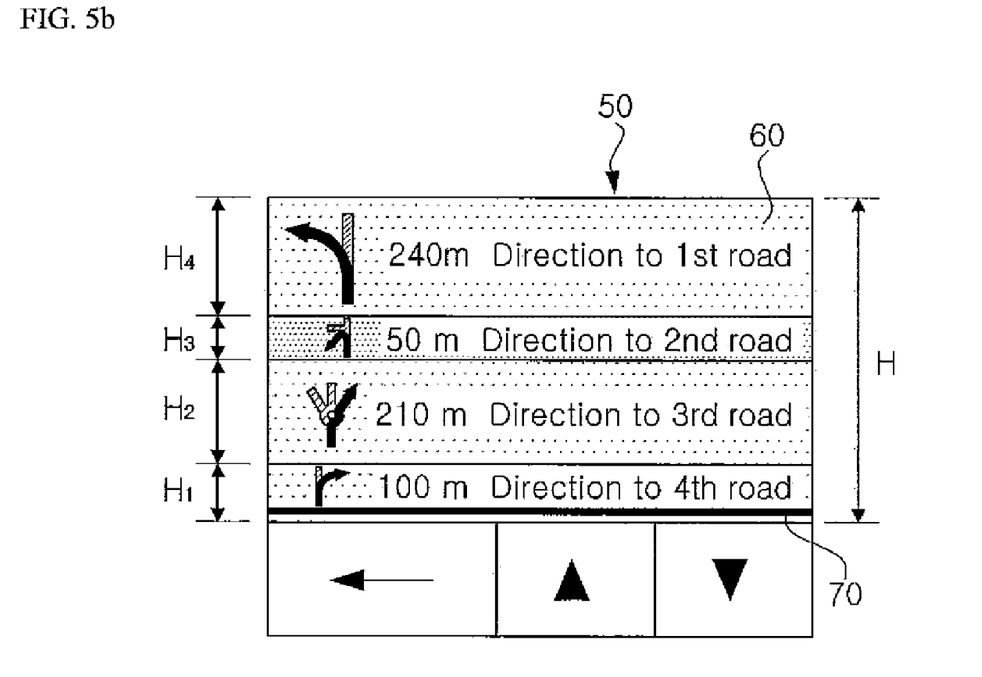

FIG. 5b is a view showing a TBT list when the navigation apparatus moves 50 m. As shown in the figure, although distance information of the TBT list for the next TBT is changed from 100 m to 50 m by the movement, the height of the lowermost display area is not changed. In this aspect, if a new display area for a TBT ahead is not added, the heights of the upper three display areas are not changed. The distance of 50 m is notional, with other values possible. The distance may be preset by the manufacturer or may be set by the user.

Then, if the navigation apparatus passes through the display area 60, TBT information on the next position is displayed to show n (here, four) pieces of TBT information again, and the heights of the display areas 60 are recalculated to include the newly added TBT information.

The height of the lowermost display area is not changed (h1=H2), and only the heights of the other three displays are newly calculated.

Figure 5C:
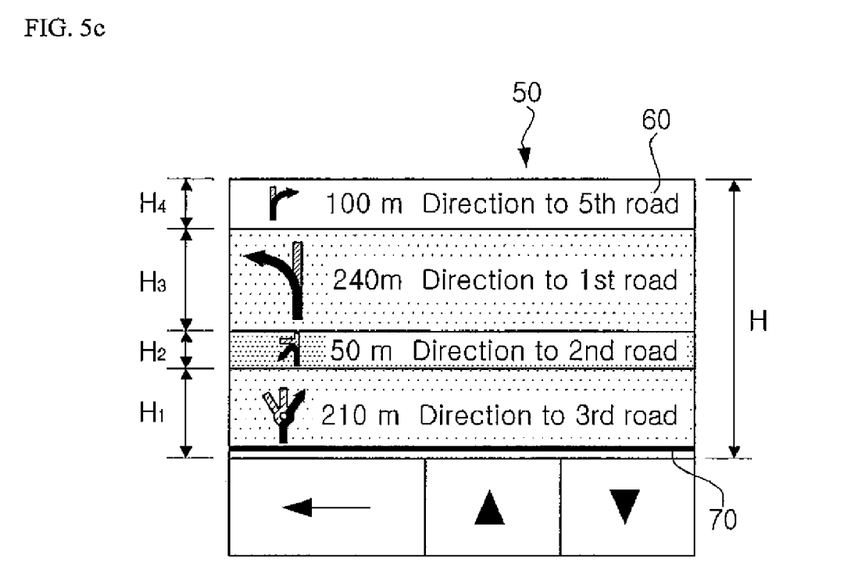

A view of the updated TBT list 50 is shown in FIG. 5c.

As shown in the figure, the upper three pieces of TBT information shown in FIG. 5b are shifted down in order one by one, and the new TBT information is displayed in the uppermost display area. The heights of the upper three display areas 60 are recalculated.

Figure 5D:
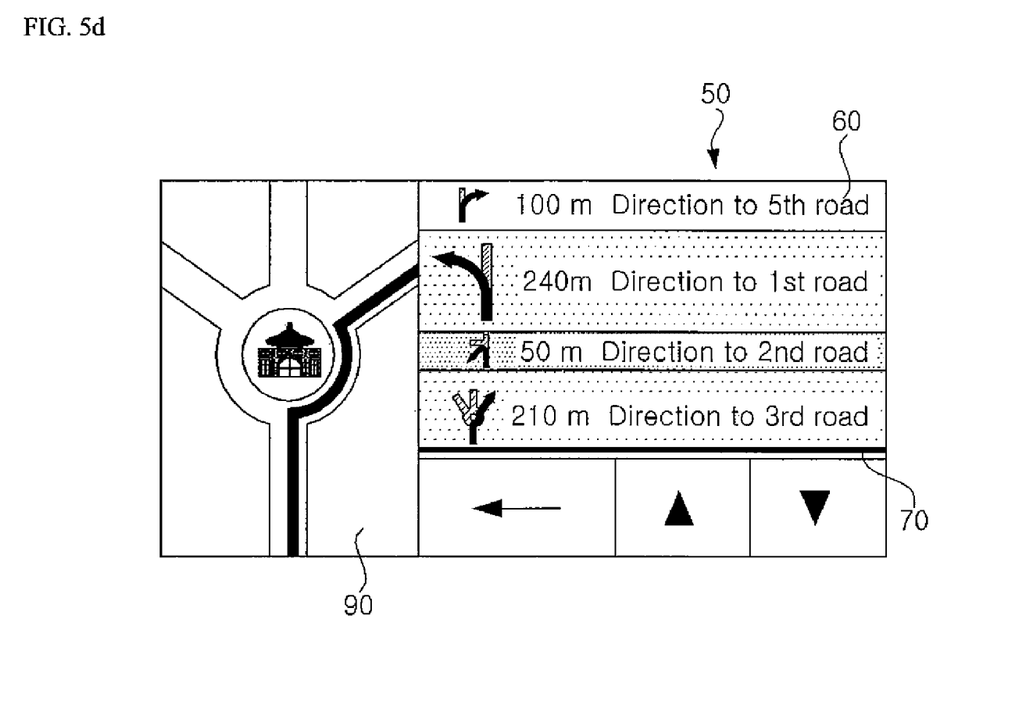

As shown in FIG. 5d, if a TBT positioned at the nearest ahead in the updated TBT list corresponds to a multi-intersection, the direction indicating icon is displayed on a larger scale through a pop-up window. At this time, rather than displaying the direction indicating icon on a large scale while maintaining its shape, it is preferable to display an image of the real position of the TBT as shown in the figure so that a user may easily recognize the TBT.

The scope of the present invention is not limited to the embodiment described and illustrated above but is defined by the appended claims. It will be apparent that those skilled in the art can make various modifications and changes thereto within the scope of the invention defined by the claims.

For example, N, n, X, and the like used in describing the embodiments of the present invention are variables for merely representing any predetermined numbers.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller.

For a software implementation, the embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The devices described above may include one or more memories. These memories may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The GPS devices describe above may be installed in an automobile, truck, boat, airplane or other vehicle. These GPS devices may also be handheld mobile terminals implemented in a variety of different configurations. Examples of such configurations include folder-type, slide-type, bar-type, rotational-type, swing-type and combinations thereof. Handheld mobile terminals may be wireless communications terminals, PDAs, book readers or other handheld devices. These devices may equipped to perform a variety of other functions, such as calendar, address, word processing, image/video capture/processing and the like.

For mobile terminal embodiment configured to wirelessly communicate with other terminals, during typical operation of the wireless communication system, there are base stations that receive sets of reverse-link signals from various mobile terminals. The mobile terminals are engaging in calls, messaging, and other communications. Each reverse-link signal received by a given base station is processed within that base station. The resulting data is forwarded to an associated base station controller (BSC). The BSC provides call resource allocation and mobility management functionality including the orchestration of soft handoffs between base stations. The BSCs also route the received data to the MSC, which provides additional routing services for interfacing with the PSTN. Similarly, the PSTN interfaces with the MSC, and the MSC interfaces with the BSCs, which in turn control the base stations to transmit sets of forward-link signals to the mobile terminals.

What is claimed is:

1. A navigation apparatus, comprising:
a Global Positioning System ("GPS") receiving module configured to receive navigation satellite signals and to calculate a current position of the navigation apparatus;
a controller configured to receive position information from the GPS receiving module, to output the position information together with map information, and to control operation of the GPS receiving module; and
a storage unit configured to store the map information,
wherein the controller is configured to display information on two or more turn-by-turn positions ("TBTs") on a route in the form of a TBT list, and to determine a display size of entries in the TBT list depending on distances from the current position of the navigation apparatus to the TBTs included in the TBT list.

2. The apparatus as claimed in claim 1, wherein the TBT information includes a location of a TBT and a proceeding direction at the TBT.

3. The apparatus as claimed in claim 2, wherein the controller is configured to display the TBT information vertically on a display screen, and to determine heights of respective TBT display areas depending on the distances from the current position of the navigation apparatus to the TBTs included in the TBT list.

4. The apparatus as claimed in claim 3, wherein the controller is configured to determine the heights of the display areas in proportion to the distances to the TBTs.

5. The apparatus as claimed in claim 4, wherein the controller is configured to display the TBT list in a predetermined number of display areas.

6. The apparatus as claimed in claim 4, wherein the controller is configured to display the TBT list in a predetermined number of display areas included corresponding to a predetermined distance ahead of the navigation apparatus.

7. The apparatus as claimed in claim 4, further comprising:
a wireless communication module configured to receive traffic information and to vary a display form of the TBT list depending on the received traffic information.

8. The apparatus as claimed in claim 7, wherein the controller is configured to vary a color of the display form depending on the traffic information.

9. The apparatus as claimed in claim 4, wherein the controller is configured to display a first icon for an upcoming driving road and a second icon for an upcoming non-driving road.

10. The apparatus as claimed in claim 9, wherein the controller is configured to pop up or enlarge a corresponding one of the first and second icon.

11. The apparatus as claimed in claim 4, wherein the controller is configured to update the TBT list if the current position is changed.

12. The apparatus as claimed in claim 4, wherein the controller is configured to scroll the TBT list according to a moving speed of the navigation apparatus.

13. The apparatus as claimed in claim 4, wherein the controller is configured to recalculate heights of all or some of the display areas depending on a change in position of the navigation apparatus.

14. The apparatus as claimed in claim 3, wherein the controller is configured to determine the heights of the respective display areas according to steps within a lookup table, the lookup table comprising:

| Step | Distance range | List height |
|------|----------------|-------------|
| 1 | 0~500 m | $H \times \frac{1}{6}$ |
| 2 | 500 m~1 Km | $H \times \left(\frac{1}{6} + \frac{1}{10}\right)$ |
| 3 | 1 Km~10 Km | $H \times \left(\frac{1}{6} + \frac{2}{10}\right)$ |
| 4 | 10 Km~30 Km | $H \times \left(\frac{1}{6} + \frac{3}{10}\right)$ |
| 5 | 30 Km~50 Km | $H \times \left(\frac{1}{6} + \frac{4}{10}\right)$ |
| 6 | More then 50 Km | $H \times \left(\frac{1}{6} + \frac{5}{10}\right)$ |

15. The apparatus as claimed in claim 3, wherein the controller is configured to determine the heights of the respective display areas according to a set of formulas comprising:

$$H_1 = \frac{l_1}{\sum_{m=1}^{n} l_m} \times H$$

$$H_2 = \frac{l_2}{\sum_{m=1}^{n} l_m} \times H$$

$$M$$

$$H_n = \frac{l_n}{\sum_{m=1}^{n} l_m} \times H$$

where, H denotes a available maximum height of the TBT list, n denotes a number of the display areas configuring the TBT list, Hn denotes a height of the display area displayed in an n-th position, and $1_n$ denotes distance information on a TBT included in an n-th display area.

16. A method for providing, in a navigation apparatus, turn-by-turn position ("TBT") on information on a driving route, the method comprising the steps of:
displaying, by the navigation apparatus, TBT information on two or more TBTs on the driving route in the form of a TBT list, including determining, by the navigation apparatus, a display size of entries in the TBT list depending on distances from a current position of the navigation apparatus to the TBTs included in the TBT list.

17. The method as claimed in claim 16, the step of displaying TBT information comprising:
displaying the TBT information vertically on a display screen, the step of determining a display size including determining heights of respective TBT display areas depending on the distances from the current position of the navigation apparatus to the TBTs included in the TBT list.

18. The method as claimed in claim 17, wherein the step of determining heights of respective TBT display areas comprises:
determining the heights in proportion to distances to the TBTs.

19. The method as claimed in claim 18, wherein the step of displaying TBT information comprises:
displaying the TBT list in a predetermined number of the display areas.

20. The method as claimed in claim 18, wherein the step of displaying TBT information comprises:
displaying the TBT list in a predetermined number of the display areas included corresponding to a predetermined distance ahead of the navigation apparatus.

21. The method as claimed in claim 16, further comprising:
receiving traffic information, wherein
the step of displaying TBT information includes varying a display form of the TBT list depending on the received traffic information.

22. The method as claimed in claim 21, wherein the step of varying a display form comprises:
varying a color of the display form depending on the traffic information.

23. The method as claimed in claim 16, further comprising:
displaying a first icon for an upcoming driving road and a second icon for an upcoming non-driving road.

24. The method as claimed in claim 23, wherein the step of displaying a first and second icon comprises one of popping up and enlarging a corresponding one of the first and second icon.

25. The method as claimed in claim 24, further comprising:
updating the TBT list if the current position is changed.

26. The method as claimed in claim 24, the step of displaying TBT information comprising:
scrolling the TBT list according to a moving speed of the navigation apparatus.

27. The method as claimed in claim 24, the step of determining heights of respective TBT display areas comprising:
recalculating heights of all or some of the display areas depending on a change in position of the navigation apparatus.

28. The method as claimed in claim 17, the step of determining heights of respective TBT display areas comprising:
determining the heights of the respective display areas according to steps within a lookup table, the lookup table comprising:

| Step | Distance range | List height |
|------|----------------|-------------|
| 1 | 0~500 m | $H \times \frac{1}{6}$ |
| 2 | 500 m~1 Km | $H \times \left(\frac{1}{6} + \frac{1}{10}\right)$ |
| 3 | 1 Km~10 Km | $H \times \left(\frac{1}{6} + \frac{2}{10}\right)$ |
| 4 | 10 Km~30 Km | $H \times \left(\frac{1}{6} + \frac{3}{10}\right)$ |

-continued

| Step | Distance range | List height |
|---|---|---|
| 5 | 30 Km~50 Km | $H \times \left(\frac{1}{6} + \frac{4}{10}\right)$ |
| 6 | More then 50 Km | $H \times \left(\frac{1}{6} + \frac{5}{10}\right)$ |

29. The method as claimed in claim 17, the step of determining heights of respective TBT display areas comprising:
determining the heights of the respective display areas according to a set of formulas comprising:

$$H_1 = \frac{l_1}{\sum_{m=1}^{n} l_m} \times H$$

$$H_2 = \frac{l_2}{\sum_{m=1}^{n} l_m} \times H$$

$$M$$

$$H_n = \frac{l_n}{\sum_{m=1}^{n} l_m} \times H$$

where H denotes a available maximum height of the TBT list, n denotes a number of the display areas configuring the TBT list, Hn denotes a height of the display area displayed in an n-th position, and $l_n$ denotes distance information on a TBT included in an n-th display area.

\* \* \* \* \*